United States Patent
Koo et al.

(10) Patent No.: US 10,447,760 B2
(45) Date of Patent: *Oct. 15, 2019

(54) METHOD OF SHARING CONTENTS BY USING PERSONAL CLOUD DEVICE, AND ELECTRONIC DEVICE AND PERSONAL CLOUD SYSTEM USING THE SAME

(71) Applicant: Samsung Electronics Co., Ltd., Suwon-si, Gyeonggi-do (KR)

(72) Inventors: Bon-hyun Koo, Suwon-si (KR); Su-byeong Oh, Suwon-si (KR); Kyoung-lae Noh, Hwaseong-si (KR); Ki-eun Shin, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,578

(22) Filed: Oct. 3, 2017

(65) Prior Publication Data
US 2018/0027046 A1 Jan. 25, 2018

Related U.S. Application Data

(63) Continuation of application No. 14/143,839, filed on Dec. 30, 2013, now Pat. No. 9,813,478.

(30) Foreign Application Priority Data

Jan. 4, 2013 (KR) .................. 10-2013-0001250

(51) Int. Cl.
*H04L 29/08* (2006.01)
*H04L 29/06* (2006.01)

(52) U.S. Cl.
CPC ............ *H04L 67/02* (2013.01); *H04L 63/083* (2013.01); *H04L 67/1095* (2013.01);
(Continued)

(58) Field of Classification Search
CPC . H04L 67/1095; H04L 67/1097; H04L 67/02; H04L 63/083; H04L 63/061
See application file for complete search history.

(56) References Cited

U.S. PATENT DOCUMENTS 7,725,474 B2  5/2010  Tamai et al.
7,865,572 B2  1/2011  Ho et al.
(Continued)

FOREIGN PATENT DOCUMENTS

CN   101819665 A   9/2010
CN   102611686 A   7/2012
(Continued)

OTHER PUBLICATIONS

Matt Smith, Using the Magic Pocket: A Dropbox Guide, XP002680091, Nov. 23, 2010, pp. 1-36.
(Continued)

*Primary Examiner* — Hee K Song
(74) *Attorney, Agent, or Firm* — Jefferson IP Law, LLP

(57) ABSTRACT

A method of sharing content by using a personal cloud device and an electronic device and a personal cloud system using the method are provided. The method includes connecting to a personal cloud device configured to share the content with another electronic device, if a new first content is added to a set first folder, determining an upload condition of the electronic device, and if the upload condition satisfies a set condition, transmitting the first content to the personal cloud device. Accordingly, a user is able to share contents between a plurality of electronic devices by using a personal cloud device in real time.

21 Claims, 12 Drawing Sheets

(52) U.S. Cl.
CPC ...... *H04L 67/1097* (2013.01); *H04L 63/0428* (2013.01); *H04L 63/061* (2013.01)

(56) References Cited

U.S. PATENT DOCUMENTS

| | | |
|---|---|---|
| 9,661,102 B2 | 5/2017 | Lee et al. |
| 9,813,478 B2 | 11/2017 | Koo et al. |
| 2002/0161980 A1 | 10/2002 | Nishikawa |
| 2004/0170262 A1 | 9/2004 | Ohno |
| 2004/0236731 A1 | 11/2004 | Tamai et al. |
| 2011/0151837 A1 | 6/2011 | Winbush, III |
| 2012/0030318 A1 | 2/2012 | Ryder |
| 2012/0047331 A1 | 2/2012 | Meza et al. |
| 2012/0079126 A1 | 3/2012 | Evans et al. |
| 2012/0166538 A1 | 6/2012 | Son et al. |
| 2012/0203733 A1 | 8/2012 | Zhang |
| 2012/0215885 A1 | 8/2012 | Lee et al. |
| 2012/0265803 A1 | 10/2012 | Ha et al. |
| 2012/0304233 A1 | 11/2012 | Roberts et al. |
| 2013/0145048 A1 | 6/2013 | Lee et al. |
| 2013/0218961 A1 | 8/2013 | Ho |
| 2013/0275409 A1 | 10/2013 | Moganti et al. |
| 2013/0297739 A1 | 11/2013 | Faihe et al. |
| 2013/0346704 A1 | 12/2013 | Burger et al. |
| 2014/0173036 A1 | 6/2014 | Das |
| 2014/0195805 A1 | 7/2014 | Koo et al. |
| 2018/0027046 A1 | 1/2018 | Koo et al. |

FOREIGN PATENT DOCUMENTS

| | | |
|---|---|---|
| CN | 103916457 A | 7/2014 |
| EP | 1 453 247 A2 | 9/2004 |
| EP | 2 224 685 A1 | 9/2010 |
| JP | 2004-266453 A | 9/2004 |
| JP | 2004-348337 A | 12/2004 |
| JP | 2010/0068086 A | 3/2010 |
| KR | 10-2007-0059221 A | 6/2007 |
| KR | 10-2011-0133301 A | 12/2011 |
| KR | 10-2012-0095573 A | 8/2012 |
| KR | 10-2012-0113106 A | 10/2012 |

OTHER PUBLICATIONS

Chinese Office Action dated Aug. 29, 2018 issued in Chinese Patent Application No. 201410005243.4.
Korean Office Action dated Oct. 30, 2018 issued in Korean Patent Application No. 10-2013-0001250.
Korean Notice of Allowance dated Apr. 11, 2019, issued in the Korean Patent Application No. 10-2013-0001250.
Chinese Office Action dated Feb. 15, 2019, issued in the Chinese Patent Application No. 201410005243.4.
Chinese Office Action dated Aug. 14, 2019, issued in the Chinese Patent Application No. 201410005243.4.

METHOD OF SHARING CONTENTS BY USING PERSONAL CLOUD DEVICE, AND ELECTRONIC DEVICE AND PERSONAL CLOUD SYSTEM USING THE SAME

CROSS-REFERENCE TO RELATED APPLICATION(S)

This application is a continuation application of prior application Ser. No. 14/143,839, filed on Dec. 30, 2013, which claims the benefit under 35 U.S.C. § 119(a) of a Korean patent application filed on Jan. 4, 2013 in the Korean Intellectual Property Office and assigned Serial No. 10-2013-0001250, the entire disclosure of which is hereby incorporated by reference.

TECHNICAL FIELD

The present disclosure relates to a method of sharing contents and an electronic device and a personal cloud system using the same. More particularly, the present disclosure relates to a method of accessing a personal cloud device through a network in a home or through an external network to share contents, and an electronic device and a personal cloud system using the same.

BACKGROUND

A cloud service has been provided to store various types of contents in a server and allows for downloading the contents from the server at any time and from anywhere by using an electronic device, such as a smart phone, or the like.

Among these cloud services, a public cloud service of the related art includes a server having a fixed infrastructure. A client (for example, an electronic device) accesses the server through a fixed Internet identifier (for example, an Internet Protocol (IP) address or a domain). A Network Attached Storage (NAS) system of the related art is a sharing storage system on a network, wherein the sharing storage system uploads or downloads contents by using an electronic device to share the contents.

Since a cloud service of the related art shares a cloud server as described above, a privacy issue occurs. For example, a plurality of electronic devices (for example, a smart phone, a smart TV, a tablet Personal Computer (PC), and the like) may be used in a home, and a need may exist for sharing contents between family members.

Therefore, a need exists for a method of sharing contents between a plurality of electronic devices by using a personal cloud device installed in a home, and an electronic device and a personal cloud system using the same.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of sharing contents between a plurality of electronic devices by using a personal cloud device installed in a home, and an electronic device and a personal cloud system using the same.

Another aspect of the present disclosure is to provide a user authentication method of providing a secure area in a personal cloud device to allow only a certified user to use contents of the secure area.

In accordance with an aspect of the present disclosure, a method of sharing content of an electronic device is provided. The method includes connecting to a personal cloud device configured to share the content with another electronic device, if a new first content is added to a set first folder, determining an upload condition of the electronic device, and if the upload condition satisfies a set condition, transmitting the first content to the personal cloud device.

The upload condition may include at least one of a status of a network connected between the electronic device and the personal cloud and battery information of the electronic device.

If the electronic device and the personal cloud device are connected to each other through a set network interface, and a residual amount of a battery of the electronic device is higher than or equal to a set value, the first content may be transmitted to the personal cloud device.

If the first content is transmitted, the personal cloud device may store the first content in a set folder and update a DataBase (DB) configured to manage contents.

The method may further include determining a download condition of the electronic device, if the download condition of the electronic device satisfies a set condition, periodically requesting update information of the DB from the personal cloud device, if the update information exists in the DB, downloading an updated second content from the personal cloud device, and storing the second content in a second folder, and wherein the DB is configured to manage contents of the personal cloud device.

The download condition may include at least one of a status of a network connected between the electronic device and the personal cloud device, battery information of the electronic device, and memory information of the electronic device.

Content information and a time stamp that are recorded in the DB of the personal cloud device and lastly downloaded by the electronic device may be determined to request updated content information from the personal cloud device.

The method may further include, if the second content is completely downloaded, transmitting a download result to the personal cloud device, wherein the personal cloud device updates content information and a time stamp lastly updated by the electronic device based on the download result.

The method may further include, if the first content stored in the first folder is revised to generate a third content, determining an upload condition of the electronic device, and if the upload condition satisfies a set condition, transmitting the third content to the personal cloud device, wherein the personal cloud device stores the first and second contents together.

The method may further include, if a fourth content generated by revising the second content exists in the DB of the personal cloud device, downloading the fourth content from the personal cloud device, and storing the downloaded fourth content and the second content together in the second folder.

If an external device is connected to the personal cloud device through a wire, and content stored in the external device is uploaded into the personal cloud device, the personal cloud device may update the DB of the personal cloud device, and the electronic device may download the content stored in the external device from the personal cloud device.

If an external device is connected to the personal cloud device through a wire, and a new sixth content is overwritten on a fifth content stored in the personal cloud device through the external device, the personal cloud device stores the sixth content and a time stamp when the sixth content is overwritten, in the DB, and the electronic device determines the time stamp to download the sixth content in order to store the sixth content and the fifth content together.

In accordance with another aspect of the present disclosure, an electronic device is provided. The electronic device includes a communicator configured to communicate with a personal cloud device configured to share contents with another device, a storage unit configured to store the contents, and a controller configured to control the communicator to determine an upload condition of the electronic device if a new first content is added to a set first folder of the storage unit, and to transmit the first content to the personal cloud device if the upload condition satisfies a set condition.

The upload condition may include at least one of a status of a network connected between the electronic device and the personal cloud and battery information of the electronic device.

If the electronic device and the personal cloud device are connected to each other through a set network interface, and a residual amount of a battery of the electronic device is higher than or equal to a set value, the controller may control the communicator to transmit the first content to the personal cloud device.

If the first content is transmitted, the personal cloud device may store the first content in a set folder and update a DB configured to manage contents.

The controller may determine a download condition of the electronic device, periodically request update information of the DB from the personal cloud device if the download condition of the electronic device satisfies a set condition, control the communicator to download an updated second content from the personal cloud device if the update information exists in the DB, and store the second content in a second folder, and wherein the DB is configured to manage contents of the personal cloud device.

The download condition may include at least one of a status of a network connected between the electronic device and the personal cloud device, battery information of the electronic device, and memory information of the electronic device.

The controller may control the communicator to determine content information and a time stamp that are recorded in the DB of the personal cloud device and lastly downloaded by the electronic device to request updated content information from the personal cloud device.

If the second content is completely downloaded, the controller may control the communicator to transmit a download result to the personal cloud device, wherein the personal cloud device updates content information and a time stamp lastly downloaded by the electronic device based on the download result.

If the first content stored in the first folder is revised to generate a third content, the controller may determine an upload condition of the electronic device and, if the upload condition satisfies a set condition, control the communicator to transmit the third content to the personal cloud device, wherein the personal cloud device stores the first and second contents together.

If a fourth content generated by revising the second content exists in the DB of the personal cloud device, the controller may control the communicator to download the fourth content from the personal cloud device and control the storage unit to store the downloaded fourth content and the second content together in the second folder.

If an external device is connected to the personal cloud device through a wire, and content stored in the external device is uploaded into the personal cloud device, the personal cloud device may update the DB of the personal cloud device, and the controller may control the communicator to download the content stored in the external device from the personal cloud device.

If an external device is connected to the personal cloud device through a wire, and a new sixth content is overwritten on a fifth content stored in the personal cloud device through the external device, the personal cloud device may store the sixth content and a time stamp when the sixth content is overwritten, in the DB, and the controller may control the communicator to determine the time stamp in order to download the sixth content and control the storage unit to store the sixth content and the fifth content together.

In accordance with another aspect of the present disclosure, a method of sharing content in a personal cloud system comprising a first electronic device, a second electronic device, and a personal cloud device is provided. The method includes connecting between the first electronic device, the second electronic device, and the personal cloud device if a new first content is added to a set first folder of the first electronic device, determining an upload condition of the first electronic device through the first electronic device, if the upload condition satisfies a set condition, transmitting the first content from the first electronic device to the personal cloud device, storing the first content in the personal cloud device and updating information of a DB, determining update information of the DB of the personal cloud device through the second electronic device to download the first content from the personal cloud device, and storing the first content in a set second folder of the second electronic device.

In accordance with another aspect of the present disclosure, a method of authenticating a user between an electronic device and a personal cloud device is provided. The method includes inputting a password into the electronic device, encoding the password by using a public key in the electronic device, transmitting the encoded password from the electronic device to the personal cloud device, verifying the encoded password by using a private key in the personal cloud device, if the encoded password is verified, generating and storing a session key for a user authentication in the personal cloud device, encoding the session key by using the private key in the personal cloud device, transmitting the encoded session key from the personal cloud device to the electronic device, and decoding the encoded session key by using the private key in the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
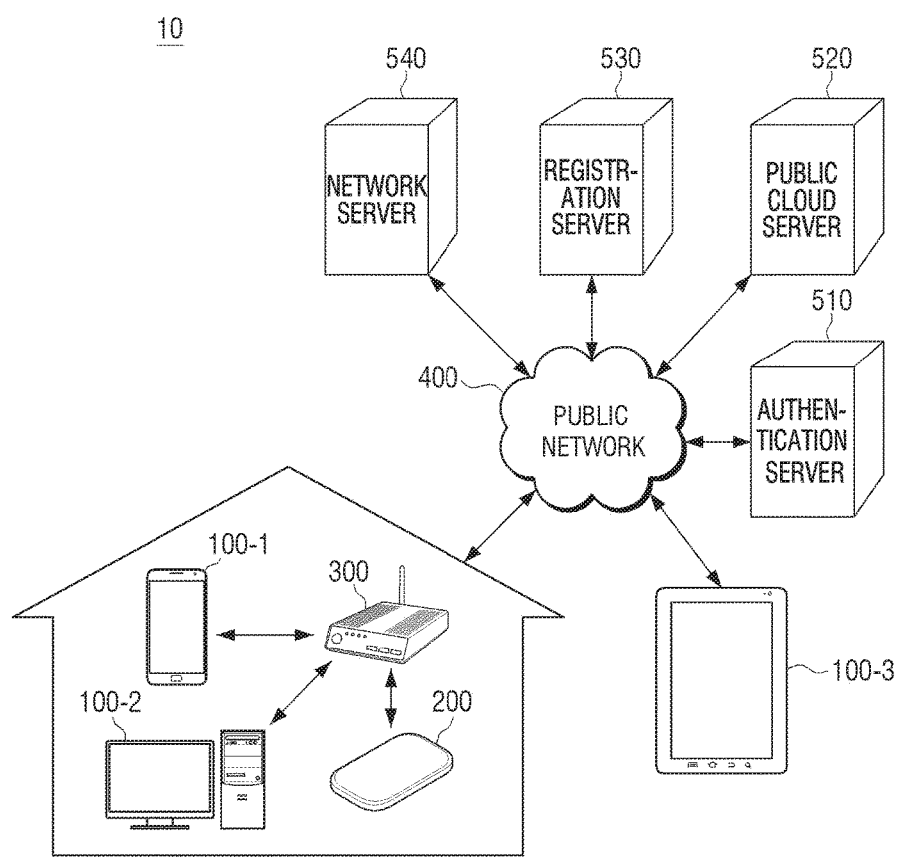
FIG. 1 illustrates a personal cloud system according to an embodiment of the present disclosure.

FIG. 1 illustrates a personal cloud system according to an embodiment of the present disclosure.

Referring to FIG. 1, a personal cloud system 10 includes a plurality of electronic devices 100-1, 100-2, and 100-3, a personal cloud device 200, a home Access Point (AP) 300, a public network 400, an authentication server 510, a public cloud server 520, a registration server 530, and a network server 540.

The plurality of electronic devices 100-1, 100-2, and 100-3 upload or download various types of contents by using the personal cloud device 200. More particularly, the plurality of electronic devices 100-1, 100-2, and 100-3 may directly communicate with the personal cloud device 200 in a home or may communicate with the personal cloud device 200 by using the public network 400 and the home AP 300 from the outside. Therefore, the plurality of electronic devices 100-1, 100-2, and 100-3 may upload or download contents (for example, photos, music, videos, and the like) by using the personal cloud device 200 in the home or from the outside.

Here, the plurality of electronic devices 100-1, 100-2, and 100-3 may be realized as various types of electronic devices, such as smart phones, tablet Personal Computers (PCs), smart TVs, or the like.

The personal cloud device 200 is installed in the home or an office to store contents so that the plurality of electronic devices 100-1, 100-2, and 100-3 area able to share the contents. Here, the personal cloud device 200 may directly communicate with any of the electronic devices 100-1, 100-2, and 100-3 (hereinafter commonly referred to as an electronic device 100) to upload or download contents, but this is only an embodiment of the present disclosure. Therefore, the personal cloud device 200 may communicate with the electronic device 100 through the home AP 300 and the public network 400.

More particularly, the personal cloud device 200 is registered in the registration server 530 based on a user account. Therefore, an arbitrary user may log in to the personal cloud device 200 through a registered user account to share contents stored in the personal cloud device 200 from the outside by using the electronic device 100.

In addition, the personal cloud device 200 may set a normal area from which a plurality of users freely upload or download contents and a secure area that only a particular user accesses. More particularly, the personal cloud device 200 may allow only a user who has undergone a user authentication process to access contents stored in the secure area. The user authentication process of the personal cloud device 200 will be described later with reference to FIG. 12.

The home AP 300 relays a connection of the electronic device 100 to the public network 400 so that the electronic device 100 and the personal cloud device 200 share contents outside the home.

The authentication server 510 certifies the user account through a login operation of the user that is performed through the electronic device 100 and transmits information about the user account to the electronic device 100 to register the personal cloud device 200 in the registration server 530.

The public cloud server 520 backs up and stores the contents stored in the personal cloud device 200.

The registration server 530 registers the plurality of electronic devices 100-1, 100-2, and 100-3 and the personal cloud device 200 based on the user account. For example, the registration server 530 may register the first electronic device 100-1 and the personal cloud device 200 based on user account "A@samsung.com" and register the second electronic device 100-2 and the personal cloud device 200 based on user account "B@samsung.com". Here, the registration server 530 may be registered based on the user account and thus, may be referred to as a user portal server. More particularly, the registration server 530 may generate a user account list based on the user account, and the user account list may include at least one of types of electronic devices, peer IDentifications (IDs), Internet Protocol (IP) addresses, and the like.

The network server 540 relays a communication between the personal cloud device 200 and an external network based on the peer IDs generated by the registration server 530 and domain information.

A user logs in to the authentication server 530 through the personal cloud system 10 described above by using the electronic device 100, connects the electronic device 100 to the personal cloud device 200, and uploads contents to the personal cloud device 200 or downloads contents from the personal cloud device 200.

The plurality of servers 510, 520, 530, and 540 may be realized as different servers, but this is only an embodiment of the present disclosure. Therefore, the plurality of servers 510, 520, 530, and 540 may be realized as one server.

Methods of sharing contents in the personal cloud system 10 according to various embodiments of the present disclosure will now be described with reference to FIGS. 2, 3, 4, 5, 6, 7, and 8.

Figure 2:
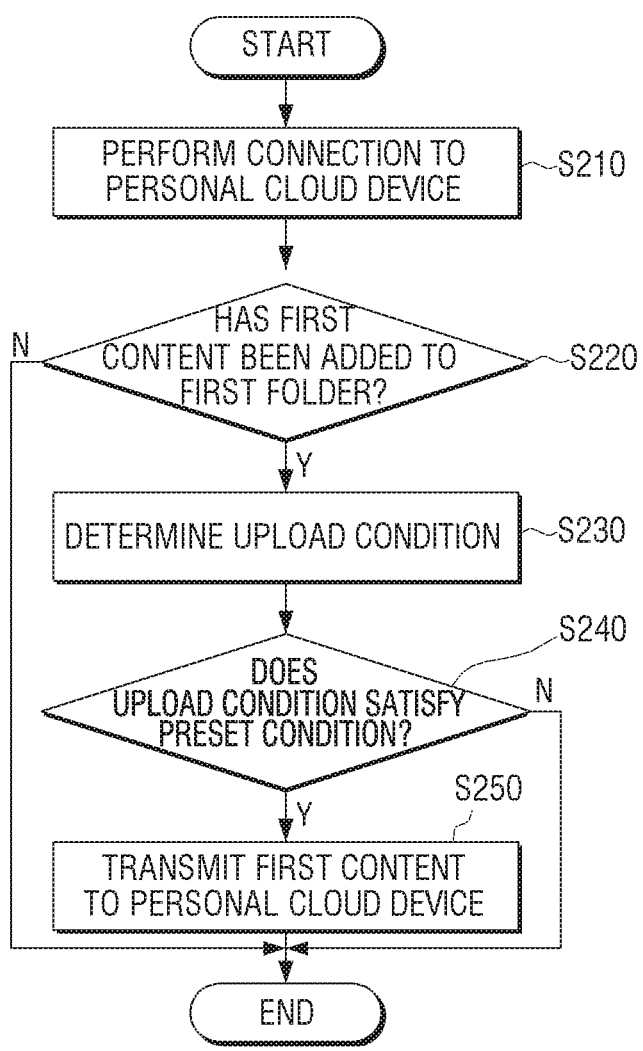
FIG. 2 is a flowchart illustrating a method of sharing contents of an electronic device according to an embodiment of the present disclosure.

FIG. 2 is a flowchart illustrating a method of sharing contents of an electronic device according to an embodiment of the present disclosure.

Referring to FIG. 2, in operation S210, the electronic device 100 performs a connection to the personal cloud device 200. Here, if a set application is executed, the electronic device 100 may perform the connection to the personal cloud device 200, but this is only an embodiment of the present disclosure. Therefore, if the electronic device 100 is turned on, the electronic device 100 may automatically perform the connection to the personal cloud device 200.

In operation S220, the electronic device 100 determines whether a first content has been added to a first folder. Here, if the first content is generated, and a storage route of the generated first content is designated to the first folder or a first content stored in another folder is copied into the first folder, the electronic device 100 may determine that the first content has been added to the first folder.

If it is determined in operation S220 that the first content has been added to the first folder, the electronic device 100 determines an upload condition in operation S230. Here, the upload condition may include at least one of a status of a network connected between the electronic device 100 and the personal cloud device 200 and information about a battery of the electronic device 100.

In operation S240, the electronic device 100 determines whether the upload condition satisfies a set condition. Here, if the electronic device 100 is connected to the personal cloud device 200 through a set network interface (for example, a WiFi interface, a Bluetooth interface, or the like), and a residual amount of the battery of the electronic device 100 is higher than or equal to a set value (for example, 50%), the electronic device 100 may determine that the upload condition satisfies the set condition. Here, the set condition may be changed by a user.

If it is determined in operation S240 that the upload condition satisfies the set condition, the electronic device 100 transmits the first content to the personal cloud device 200 in operation S250. If the first content is transmitted, the personal cloud device 200 may store the first content in a set folder and update a DataBase (DB) that manages contents.

Figure 3:
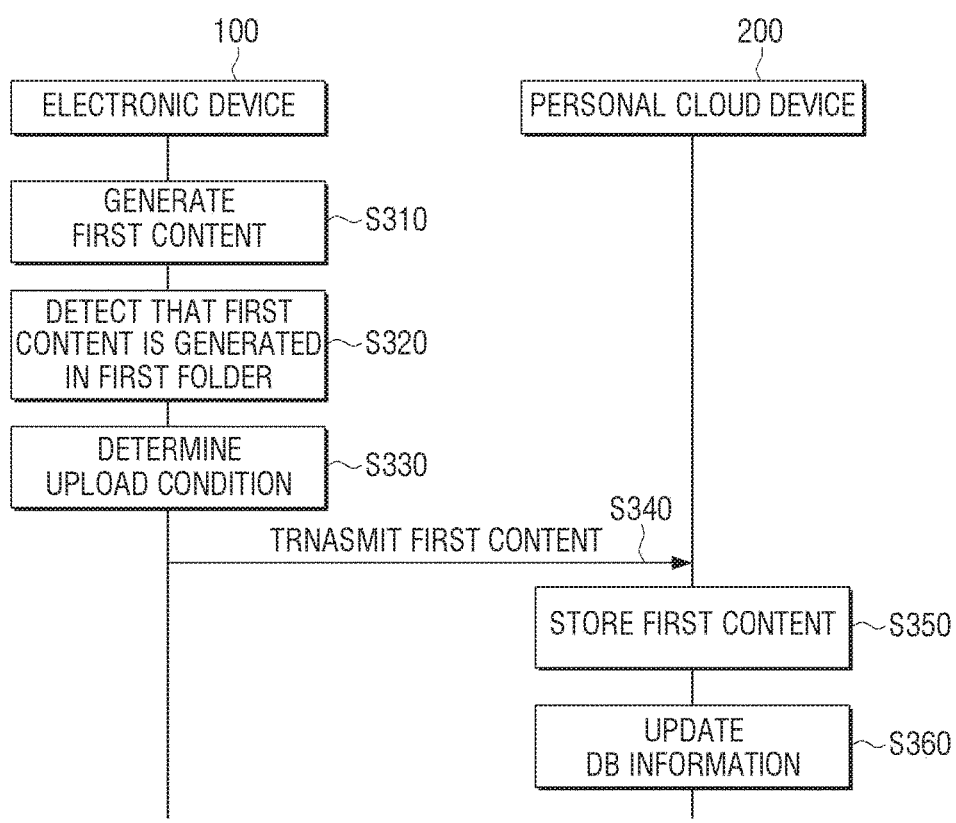
FIG. 3 is a flow diagram illustrating a method of automatically uploading contents in a personal cloud system according to an embodiment of the present disclosure.

FIG. 3 is a flow diagram illustrating a method of automatically uploading contents in a personal cloud system according to an embodiment of the present disclosure. In the present embodiment, communications are connected between the electronic device 100 and the personal cloud device 200.

Referring to FIG. 3, in operation S310, the electronic device 100 generates a first content. Here, the electronic device 100 may generate a new picture or video content through an imaging unit (not shown) and generate new document data. Here, the electronic device 100 may generate the first content (for example, A.jpg) in a first folder (for example, a Data Center Infrastructure Management (DCIM) folder).

In operation S320, the electronic device 100 detects that the first content has been generated in the first folder. Here, the first folder refers to a folder that stores content that the electronic device 100 is to automatically upload to the personal cloud device 200, wherein the first folder may be designated or added by a user.

If it is detected in operation S320 that the first content has been generated in the first folder, the electronic device 100 determines an upload condition in operation S330. More specifically, the electronic device 100 may determine whether a network interface connected to the personal cloud device 200 is a set type (for example, a WiFi interface, a Bluetooth interface, or the like) and whether a residual amount of a battery of the electronic device 100 is higher than or equal to a set value (for example 50%).

In the present embodiment, the upload condition includes a type of the network interface and the residual amount of the battery, but this is only an embodiment of the present disclosure. Therefore, the upload condition may include other conditions (for example, an upload time, whether a prohibition of uploading contents has been set by the user, and the like).

In operation S340, the electronic device 100 transmits the first content to the personal cloud device 200.

If the first content is transmitted, the personal cloud device 200 stores the first content in operation S350. Here, the personal cloud device 200 may store the first content in a set folder (for example, a sync folder, and the like). Here, the personal cloud device 200 may store contents in different folders according to the type of electronic device. For example, if a first content is transmitted from a first electronic device, the personal cloud device 200 may store the first content in a second folder (for example, sync-A). If a second content is transmitted from a second electronic device, the personal cloud device 200 may store the second content in a third folder (for example, sync-B).

In operation S360, the personal cloud device 200 updates DB information. More specifically, the personal cloud device 200 may update information about a first content that is newly added to the DB information and a time stamp indicating a time, so that another electronic device downloads the first content.

According to the methods described with reference to FIGS. 2 and 3, the electronic device 100 may automatically upload content generated in a set folder to the personal cloud device 200.

Figure 4:
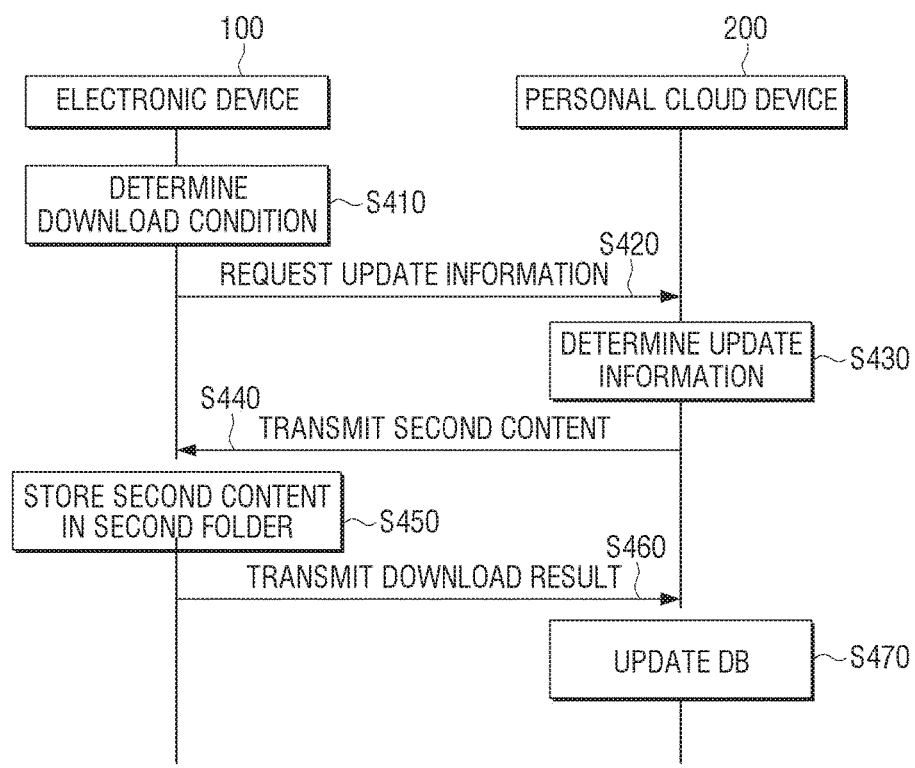
FIG. 4 is a flow diagram illustrating a method of automatically downloading contents in a personal cloud system according to an embodiment of the present disclosure.

FIG. 4 is a flow diagram illustrating a method of automatically downloading contents in a personal cloud system according to an embodiment of the present disclosure. In the present embodiment, communications are connected between the electronic device 100 and the personal cloud device 200, and a second content is stored in a set folder (for example, a sync folder) of the personal cloud device 200.

Referring to FIG. 4, in operation S410, the electronic device 100 determines a download condition of the electronic device 100. Here, the download condition may include at least one of a status of a network connected between the electronic device 100 and the personal cloud device 200, battery information of the electronic device 100, and memory information of the electronic device 100. More particularly, if a network interface connected between the electronic device 100 and the personal cloud device 200 is a set type (for example, a WiFi interface, a Bluetooth interface, or the like), the battery information (for example, remaining capacity) of the electronic device 100 is higher than or equal to a set value (for example, 50%), and the memory information (for example, available space) of the electronic device 100 is higher than or equal to a set value (for example, 100 MB), the electronic device 100 may determine that the download condition has been satisfied.

If the download condition has been satisfied, the electronic device 100 requests update information from the personal cloud device 200 in operation S420. More specifically, the electronic device 100 may determine content information and a time stamp that is recorded in a DB of the personal cloud device 200 and lastly downloaded by the electronic device 100, to request information about a newly generated content from the personal cloud device 200. Here, the electronic device 100 may periodically request the update information.

If the update information is received, the personal cloud device 200 determines the update information in operation S430. More specifically, the personal cloud device 200 may determine whether the newly generated content exists, based on the content information and the time stamp that is recorded in the DB and is lastly downloaded by the electronic device 100, to determine the update information. For example, the personal cloud device 200 may determine the content information and the time stamp lastly downloaded by the electronic device to determine that a newly generated second content exists in a set folder.

In operation S440, the personal cloud device 200 transmits the second content to the electronic device 100.

If the second content is received, the electronic device 100 stores the second content in a second folder in operation S450. Here, the second folder is different from the first folder, for example, may be a "download" folder.

In operation S460, the electronic device 100 transmits a downloaded result to the personal cloud device 200.

If the downloaded result is transmitted, the personal cloud device 200 updates the DB in operation S470. Here, the personal cloud device 200 may update the content information and the time stamp lastly downloaded by the electronic device 100, in the DB.

According to the above-described method, the electronic device 100 may receive a newly generated content from the personal cloud device 200 in real time.

Figure 5:
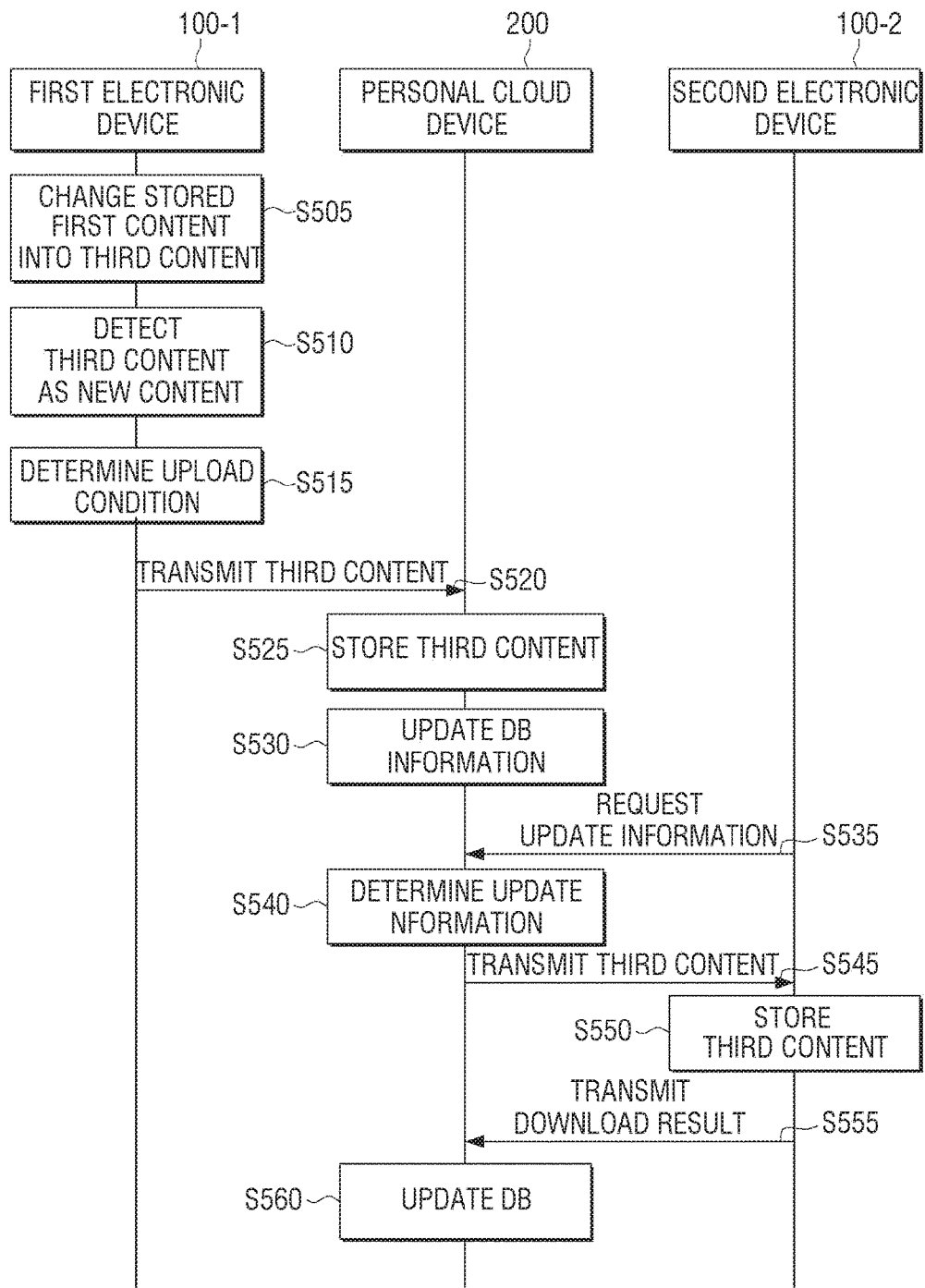
FIG. 5 is a flow diagram illustrating a method of automatically uploading and downloading contents in a personal cloud system if contents are revised in an electronic device according to an embodiment of the present disclosure.

FIG. 5 is a flow diagram illustrating a method of automatically uploading and downloading contents in a personal cloud system if contents are revised in an electronic device according to an embodiment of the present disclosure. Here, the first, second, and third electronic devices 100-1, 100-2, and 100-3 included in the personal cloud system 10 are connected to one another. The first electronic device 100-1, the second electronic device 100-2, and the personal cloud device 200 store a first content.

Referring to FIG. 5, in operation S505, the first electronic device 100-1 revises the stored first content into a third content. More specifically, the first electronic device 100-1 may revise contents of the first content through a user input to generate the third content. For example, if the first content (for example, A.doc) is a document content, the first electronic device 100-1 may newly add contents through a user input to generate the third content (for example, A'.doc). Here, titles of the first and third contents may be the same.

In operation S510, the first electronic device 100-1 detects the third content as a new content. In other words, if the first and third contents have the same titles, and at least one of contents and sizes of the first and third contents is changed, the first electronic device 100-1 may detect the third content as the new content.

In operation S515, the first electronic device 100-1 determines an upload condition. More specifically, the first electronic device 100-1 may determine whether a network interface connected to the personal cloud device 200 is a set type (for example, a WiFi interface, a Bluetooth interface, or the like) and determine whether a residual amount of a battery of the first electronic device 100-1 is higher than or equal to a set value (for example, 50%).

If the upload condition is satisfied, the first electronic device 100-1 transmits the third content to the personal cloud device 200 in operation S520.

In operation S525, the personal cloud device 200 stores the third content transmitted from the first electronic device 100-1. Here, the personal cloud device 200 may change the title of the third content into a different title from the title of the first content and store the changed title of the third content in a set folder to distinguish the third content from the first content. For example, the personal cloud device 200 may change the title of the third content from "A.doc" to "A(1).doc" and store the title of the third contents as "A(1).doc".

In operation S530, the personal cloud device 200 updates DB information. More specifically, the personal cloud device 200 may update information about the third content and a time stamp indicating an upload time so that the second electronic device 100-2 downloads the third content, wherein the information about the third content and the time stamp are newly added to the DB information.

In operation S535, the second electronic device 100-2 requests update information from the personal cloud device 200. Here, the second electronic device 100-2 may periodically request the update information.

If the request for the update information is received, the personal cloud device 200 determines the update information in operation S540. More specifically, the personal cloud device 200 may determine whether a newly generated content exists, based on content information and a time stamp lastly downloaded by the second electronic device 100-2, to determine the update information. For example, the personal cloud device 200 may determine the content information and the time stamp lastly downloaded by the second electronic device 100-2 to determine whether a newly generated third content exists in a set folder of the personal cloud device 200.

In operation S545, the personal cloud device 200 transmits the third content to the second electronic device 100-2.

If the third content is received, the second electronic device 100-2 stores the third content in operation S550. Here, the second electronic device 100-2 may store the third content in a "download" folder in which the first content has been stored.

The second electronic device 100-2 transmits a download result to the personal cloud device 200 in operation S555.

If the download result is transmitted, the personal cloud device 200 updates a DB in operation S560. Here, the personal cloud device 200 may update information about content (for example, information about the third content) and information about a time stamp in the DB, wherein the content and the time stamp are lastly downloaded by the second electronic device 100-2.

Through the personal cloud device 200 as described above, a user may share content with another electronic device, wherein the content is generated by revising content that has been stored in the first electronic device 100-1.

Figure 6:
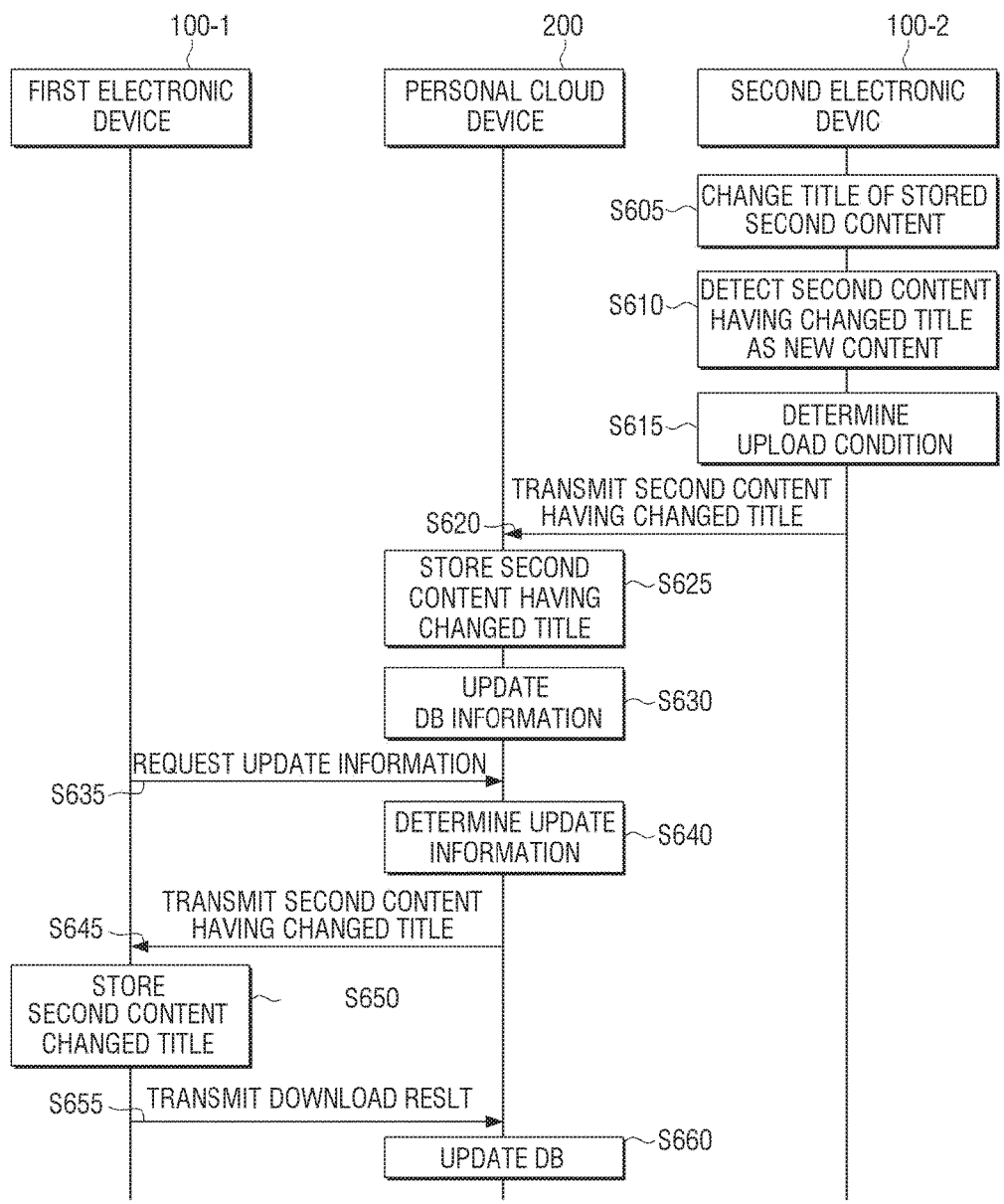
FIG. 6 is a flow diagram illustrating a method of automatically uploading and downloading contents in a personal cloud system if titles of contents are revised in an electronic device according to an embodiment of the present disclosure.

FIG. 6 is a flow diagram illustrating a method of automatically uploading and downloading contents in a personal cloud system if titles of contents are revised in an electronic device according to an embodiment of the present disclosure. Here, the first, second, and third electronic devices 100-1, 100-2, and 100-3 included in the personal cloud system 10 are connected to one another. The first electronic device 100-1, the second electronic device 100-2, and the personal cloud device 200 store a second content.

Referring to FIG. 6, in operation S605, the second electronic device 100-2 changes a title of the stored second content. More specifically, the second electronic device 100-2 may change the title of the second content through a user input. For example, if a title of a first content is B.jpg, the second electronic device 100-2 may change the title of the first content into BB.jpg through a user input.

In operation S610, the second electronic device 100-2 detects the second content having the changed title as a new content. In other words, although the first and third contents have the same contents and sizes but have changed titles, the second electronic device 100-2 may detect the second content having the changed title as the new content.

In operation S615, the second electronic device 100-2 determines an upload condition. More specifically, the second electronic device 100-2 may determine whether a network interface connected to the personal cloud device 200 is a set type (for example, a WiFi interface, a Bluetooth interface, or the like), and determine whether a residual amount of the battery of the second electronic device 100-2 is higher than or equal to a set value (for example, 50%).

If the upload condition is satisfied, the second electronic device 100-2 transmits the second content having the changed title to the personal cloud device 200 in operation S620.

In operation S625, the personal cloud device 200 stores the second content that has the changed title and is transmitted from the second electronic device 100-2. Here, the personal cloud device 200 may store the second content (BB.jpg) having the changed title and the second content (B.jpg) in a set folder (for example, a sync-B folder).

In operation S630, the personal cloud device 200 updates DB information. More specifically, the personal cloud device 200 may update information about the second content having the changed title and a time stamp indicating an upload time, so that the first electronic device 100-1 downloads the second content having the changed title, wherein the second content having the changed title is newly added to the DB information.

In operation S635, the first electronic device 100-1 requests update information from the personal cloud device 200. Here, the first electronic device 100-1 may periodically request the update information.

If the request for the update information is received, the personal cloud device 200 determines the update information in operation S640. More specifically, the personal cloud device 200 may determine whether a newly generated content exists, based on content information and a time stamp that is recorded in a DB and is lastly downloaded by the first electronic device 100-1, to determine the update information. For example, the personal cloud device 200 may determine the content information and the time stamp lastly downloaded by the first electronic device 100-1 to determine whether the second content having the changed title exists in a set folder of the personal cloud device 200.

In operation S645, the personal cloud device 200 transmits the second content having the changed title to the first electronic device 100-1.

If the second content having the changed tile is received, the first electronic device 100-1 stores the second content having the changed title in operation S650. Here, the first electronic device 100-1 may store the second content having the changed title in a "download" folder in which the second content has been stored.

In operation S655, the first electronic device 100-1 transmits a download result to the personal cloud device 200.

If the download result is transmitted, the personal cloud device 200 updates the DB in operation S660. Here, the personal cloud device 200 may update information about content (for example, information about the second content having the changed title) and information about a time stamp in the DB, wherein the content and the time stamp are lastly downloaded by the first electronic device 100-1.

Through the personal cloud system 10 as described above, if the second electronic device 100-2 changes a title of a stored content, the user may share the content having the changed title with another electronic device.

Figure 7:
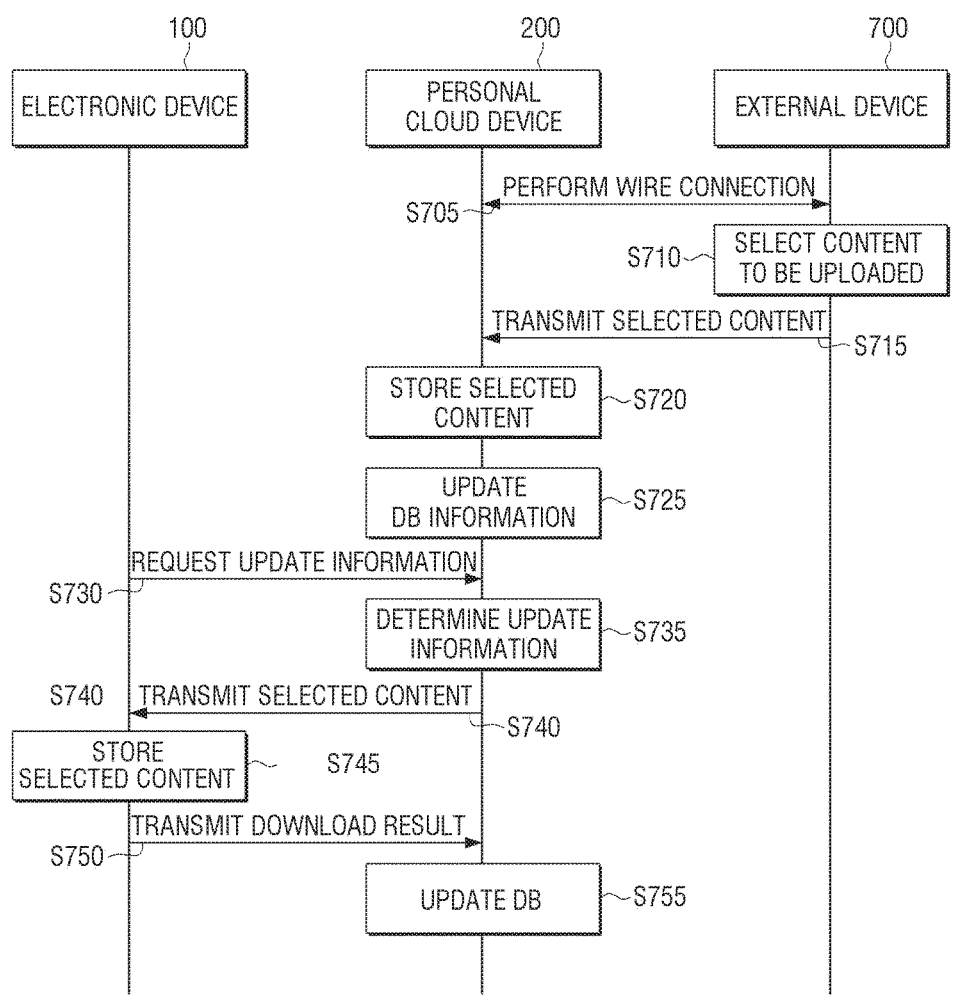
FIG. 7 is a flow diagram illustrating a method of automatically uploading and downloading contents in a personal cloud system if an external device is connected to a personal cloud device through a wire according to an embodiment of the present disclosure.

FIG. 7 is a flow diagram illustrating a method of automatically uploading and downloading contents in a personal cloud system if an external device is connected to a personal cloud device through a wire according to an embodiment of the present disclosure. Here, the electronic device 100 and the personal cloud device 200 are connected to each other.

Referring to FIG. 7, in operation S705, the personal cloud device 200 performs a wire connection to an external device 700. For example, the personal cloud device 200 may perform the wire connection to the external device 700 through a Universal Serial Bus (USB) interface by a user. Here, the external device 700 may be a device, such as a notebook PC, a tablet PC, or the like.

If the wire connection is performed between the personal cloud device 200 and the external device 700, the external device 700 selects content that is to be uploaded, in operation S710. Here, the external device 700 may select the content that is to be uploaded, through a user input. For example, the external device 700 may select "C.mp3" as content to be uploaded, through a user input. However, this is only an embodiment of the present disclosure, and thus, the external device 700 may select content that is stored in a set folder of the external device 700, as content to be uploaded.

In operation S715, the external device 700 transmits the selected content to the personal cloud device 200.

In operation S720, the personal cloud device 200 stores the selected content transmitted from the external device 700. Here, the personal cloud device 200 may store a selected content (C.mp3) having a changed title in a set folder (for example, a sync-C folder).

In operation S725, the personal cloud device 200 updates DB information. More specifically, the personal cloud device 200 may update information about the selected content and a time stamp indicating an upload time so that the electronic device 100 downloads the selected content, wherein the information about the selected content and the time stamp are newly added to the DB information.

In operation S730, the electronic device 100 requests update information from the personal cloud device 200. Here, the electronic device 100 may periodically request the update information.

If the request for the update information is received, the personal cloud device 200 determines the update information in operation S735. More specifically, the personal cloud device 200 may determine whether a newly generated content exists, based on content information and a time stamp that are recorded in a DB and are lastly downloaded by the electronic device 100, to determine the update information. For example, the personal cloud device 200 may determine the content information and the time stamp lastly downloaded by the electronic device 100 to determine that a selected content (C.mp3) exists in a set folder of the personal cloud device 200.

In operation S740, the personal cloud device 200 transmits the selected content to the electronic device 100.

If the selected content is received, the electronic device 100 stores the selected content in operation S745. Here, the electronic device 100 may store the selected content in a "download" folder.

In operation S750, the electronic device 100 transmits a download result to the personal cloud device 200.

If the download result is transmitted, the personal cloud device 200 updates a DB in operation S755. Here, the personal cloud device 200 may update information about content and information about a time stamp in the DB, wherein the content and the time stamp are lastly downloaded by the electronic device 100.

Through the personal cloud system 10 as described above, a user may share content stored in the external device 700 connected to the personal cloud device 200 through a wire with the electronic device 100 connected to the personal cloud device 200.

Figure 8:
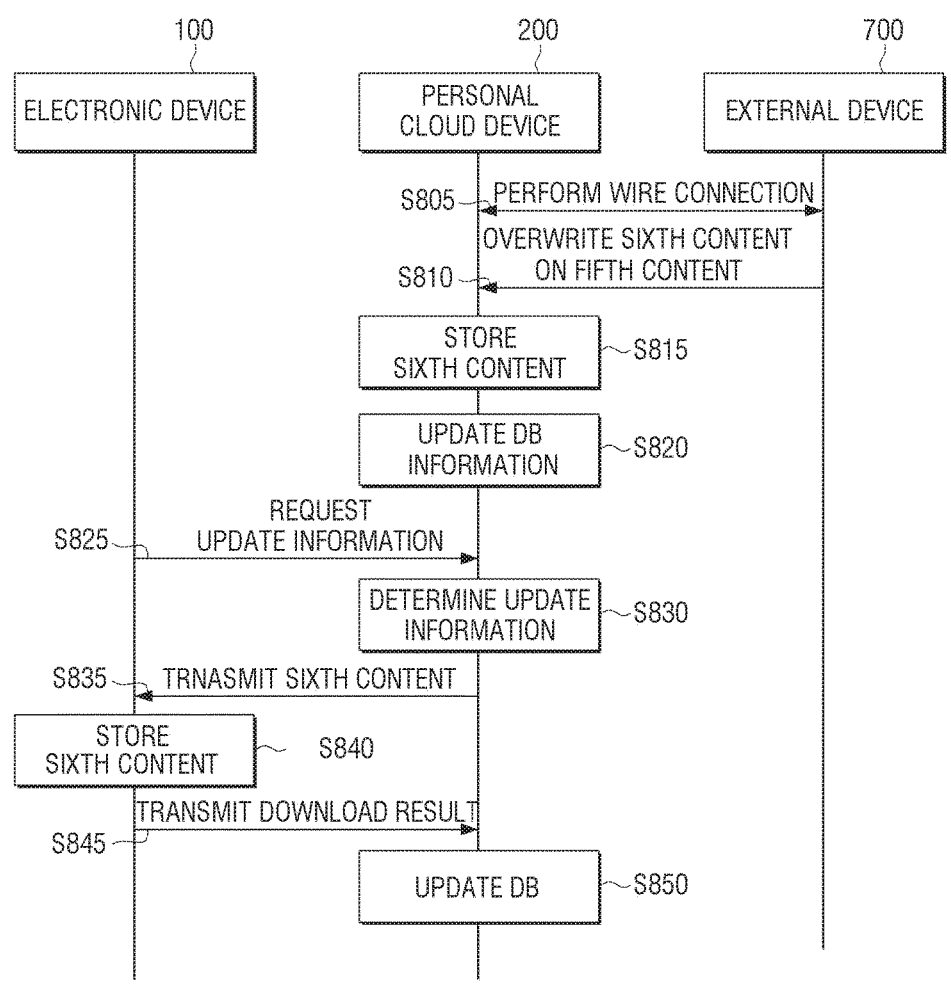
FIG. 8 is a flow diagram illustrating a method of automatically uploading and downloading contents in a personal cloud system if content overwriting is performed according to an embodiment of the present disclosure.

FIG. 8 is a flow diagram illustrating a method of automatically uploading and downloading contents in a personal cloud system if convent overwriting is performed according to an embodiment of the present disclosure. Here, the electronic device 100 and the personal cloud device 200 are connected to each other. The electronic device 100 and the personal cloud device 200 store a fifth content.

Referring to FIG. 8, in operation S805, the personal cloud device 200 performs a wire connection to the external device 700. For example, the personal cloud device 200 may perform the wire connection to the external device 700 through a USB interface by a user.

If the wire connection is performed between the personal cloud device 200 and the external device 700, the external device 700 overwrites a sixth content on the fifth content in operation S810. More specifically, the external device 700 may overwrite the sixth content having the same title as the fifth content stored in the personal cloud device 200, in the personal cloud device 200.

In operation S815, the personal cloud device 200 stores the sixth content that is overwritten on the fifth content. Here, since the personal cloud device 200 overwrites the sixth content having the same title as the fifth content on the fifth content, the personal cloud device 200 may delete only the fifth content and store only the sixth content.

In operation S820, the personal cloud device 200 updates DB information. More specifically, the personal cloud device 200 may update information about the sixth content that is overwritten on the DB information and a time stamp indicating an upload time of the sixth content, so that the electronic device 100 downloads the sixth content.

In operation S825, the electronic device 100 requests update information from the personal cloud device 200. Here, the electronic device 100 may periodically request the update information.

If the request for the update information is received, the personal cloud device 200 determines the update information in operation S830. More specifically, the personal cloud device 200 may determine whether a newly generated content exists, based on content information and a time stamp that are recorded in a DB and are lastly downloaded by the electronic device 100, to determine the update information. For example, the personal cloud device 200 may determine the content information and the time stamp lastly downloaded by the electronic device 100 to determine that the sixth content exists in a set folder of the personal cloud device 200.

In operation S835, the personal cloud device 200 transmits the sixth content to the electronic device 100.

If the sixth content is received, the electronic device 100 stores the sixth content in operation S840. Here, the electronic device 100 may store the sixth content along with the fifth content in a "download" folder. Here, the electronic device 100 may change a title of the sixth content to distinguish the sixth content from the fifth content. For example, if titles of the fifth and sixth contents are "D.avi", the electronic device 100 may change the title of the sixth content into "D(1).avi".

In operation S845, the electronic device 100 transmits a download result to the personal cloud device 200.

If the download result is transmitted, the personal cloud device 200 updates the DB in operation S850. Here, the personal cloud device 200 may update information about content and information about a time stamp in the DB, wherein the content and the time stamp are lastly downloaded by the electronic device 100.

Through the personal cloud system 10 as described above, although content stored in the personal cloud device 200 is overwritten on another content through the external device 700 connected to the personal cloud device 200 through a wire, the user may share the overwritten content in the electronic device 100 connected to the personal cloud device 200.

In the above-described embodiment, the electronic device 100 automatically downloads content stored in the personal cloud device 200 or automatically uploads content into the personal cloud device 200. However, this is only an embodiment of the present disclosure, and thus, the electronic device 100 may manually download content stored in the personal cloud device 200 or may manually upload content into the personal cloud device 200. In other words, the user may access the personal cloud device 200 to select content that is to be downloaded or uploaded, in order to perform downloading or uploading.

Structures of the electronic device 100 and the personal cloud device 200 will now be described with reference to FIGS. 9 and 10.

Figure 9:
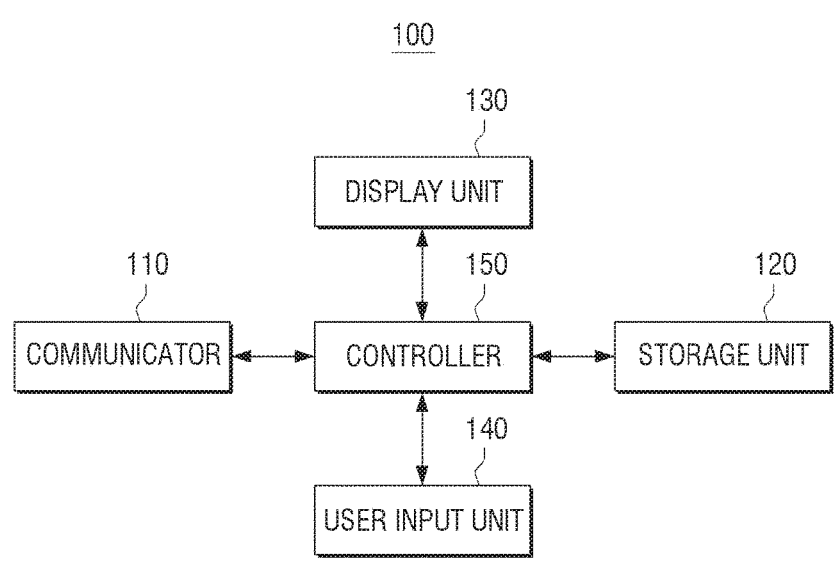
FIG. 9 is a block diagram illustrating a structure of an electronic device according to an embodiment of the present disclosure.

FIG. 9 is a block diagram illustrating a structure of an electronic device according to an embodiment of the present disclosure.

Referring to FIG. 9, the electronic device 100 includes a communicator 110, a storage unit 120, a display unit 130, a user input unit 140, and a controller 150. Here, the electronic device 100 may play various types of contents and may be realized as various types of devices, such as a smart phone, a table PC, a smart TV, and the like.

In FIG. 9, the electronic device 100 has a personal cloud service function and synthetically includes various types of elements. Therefore, according to various embodiments, some of the elements of FIG. 9 may be omitted or changed, and other elements may be added.

The communicator 110 communicates with the personal cloud device 200, the home AP 300, and the external servers 510, 520, 530, and 540. More particularly, the communicator 110 may be realized as at least one of a Near Field Communication (NFC) interface, a Wi-Fi interface, a Bluetooth interface, a Zigbee interface, and the like, to communicate with the personal cloud device 200. In addition, the communicator 110 may wirelessly communicate with an external server. Various types of communication standards, such as the Institute of Electrical and Electronics Engineers (IEEE), Zigbee, 3rd Generation (3G), 3rd Generation Partnership Project (3GPP), Long Term Evolution (LTE), and the like, may be used for the wireless communication.

The storage unit 120 stores various types of data and software modules for controlling the electronic device 100. More particularly, the storage unit 120 registers the personal cloud device 200 in the registration server 530 and includes a plurality of software modules (not shown) to share various types of contents by using the personal cloud device 200.

The storage unit 120 stores content that is uploaded or downloaded from the personal cloud device 200.

The display unit 130 outputs an image content under control of the controller 150. For example, the display unit 130 may display a picture content and a moving picture content.

The user input unit 140 receives a user command for controlling the electronic device 100. The user input unit 140 may be realized as a touch screen, but this is only an embodiment of the present disclosure. Therefore, the user input unit 140 may be realized as various types of input devices, such as a mouse, a pointing device, a motion input unit, a button, and the like.

The controller 150 controls an overall function of the electronic device 100 according to the user command input through the user input unit 140. More particularly, if a new first content is added to a set first folder of the storage unit 120, the controller 150 determines an upload condition of the electronic device 100. Here, the upload condition may include at least one of a status of a network connected between the electronic device 100 and the personal cloud device 200 and battery information of the electronic device 100.

If the upload condition satisfies a set condition, the controller 150 controls the communicator 110 to transmit the first content to the personal cloud device 200. More specifically, if the electronic device 100 and the personal cloud device 200 are connected to each other through a set network interface (for example, a WiFi interface, a Bluetooth interface, or the like), and a residual amount of the battery of the electronic device 100 is higher than or equal to a set value, the controller 150 may control the communicator 110 to transmit the first content to the personal cloud device 200.

If the first content is transmitted, the personal cloud device 200 may store the first content in a set folder and update a DB that manages contents.

The controller 150 determines a download condition of the electronic device 100 to download content stored in the personal cloud device 200. Here, the download condition may include at least one of a status of a network connected between the electronic device 100 and the personal cloud device 200, battery information of the electronic device 100, and memory information of the electronic device 100.

If the download condition of the electronic device 100 satisfies a set condition, the controller 150 may control the communicator 110 to periodically request update information of the DB, which manages contents of the personal cloud device 200, from the personal cloud device. Here, the controller 150 may control the communicator 110 to determine content information and a time stamp that are recorded in the DB of the personal cloud device 200 and are lastly downloaded by the electronic device 100 in order to request updated content information from the personal cloud device 200.

If the update information exists in the DB, the controller 150 may control the communicator 110 to download an updated second content from the personal cloud device 200 and store the second content in a set second folder (for example, a "download" folder) of the storage unit 120.

If the second content is completely downloaded, the controller 150 may control the communicator 110 to transmit a download result to the personal cloud device 200. Here, the personal cloud device 200 may update the content information and the time stamp lastly downloaded by the electronic device 100 based on the download result.

If the first content stored in the first folder is revised to generate a third content, the controller 150 may determine an upload condition of the electronic device 100 and, if the upload condition satisfies a set condition, the controller 150 may control the communicator 110 to transmit the third content to the personal cloud device 200.

If the second content stored in the DB of the personal cloud device 200 is revised to generate a fourth content, the controller 150 may control the communicator 110 to download the fourth content from the personal cloud device 200 and control the storage unit 120 to store the fourth content and the second content together in the second folder. Here, the fourth content may be content that is generated by revising at least one of the content, the size, and the title of the second content.

If the personal cloud device 200 is connected to the external device 700 through a wire, and content stored in the external device 700 is uploaded into the personal cloud device 200, the DB of the personal cloud device 200 may be updated, and the controller 150 may control the communicator 110 to download the content stored in the external device 700 from the personal cloud device 200.

If the personal cloud device 200 is connected to the external device 700 through a wire, a new sixth content is overwritten on a fifth content stored in the personal cloud device 200 through the external device 700, the personal cloud device 200 may store the sixth content and a time stamp when the sixth content is overwritten, in the DB, and the controller 150 may control the communicator 110 to determine the time stamp in order to download the sixth content and may control the storage unit 120 to store the fifth content and the sixth content together.

Figure 10:
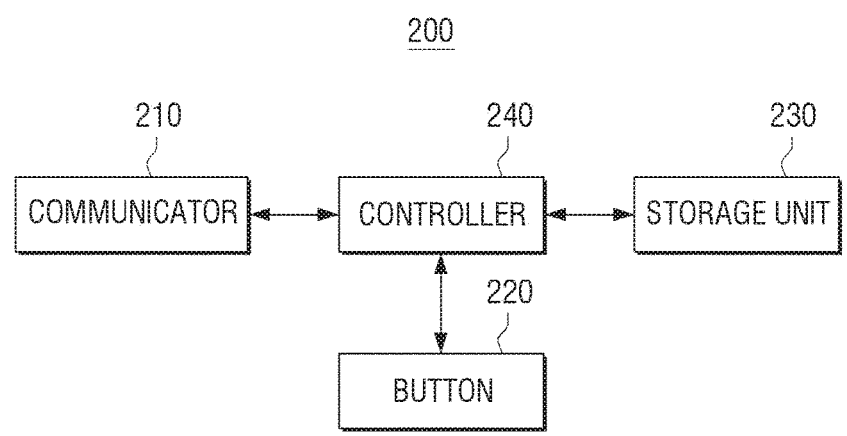
FIG. 10 is a block diagram illustrating a structure of a personal cloud device according to an embodiment of the present disclosure.

FIG. 10 is a block diagram illustrating a structure of a personal cloud device according to an embodiment of the present disclosure.

Referring to FIG. 10, the personal cloud device 200 includes a communicator 210, a button 220, a storage unit 230, and a controller 240.

The communicator 210 communicates with the electronic device 100 and the home AP 300. Here, the communicator 210 may use at least one of an NFC communication interface, a WiFi interface, a Bluetooth interface, a Zigbee interface, and the like, to communicate with the electronic device 100 and the home AP 300.

The button 220 receives a user command. More particularly, the button 220 receives a user command to perform pairing with the electronic device 100.

The storage unit 230 stores various types of data and various software modules for controlling the personal cloud device 200. More particularly, the storage unit 230 registers the personal cloud device 200 in the registration server 530 and includes a plurality of software modules to share various types of contents by using the personal cloud device 200.

The storage unit 230 stores a DB that manages uploading and downloading of contents to share contents between a plurality of electronic devices 100. More specifically, the DB may store information about contents and time stamps, respectively, lastly downloaded by the plurality of electronic devices 100 and store information about contents and time stamps, respectively, lastly uploaded by the plurality of electronic devices 100.

The controller 240 controls an overall operation of the personal cloud device 200. More particularly, if content is uploaded from the electronic device 100, the controller 240 stores the uploaded content in the storage unit 230 and updates the DB of the storage unit 230. More specifically, if content is uploaded from the electronic device 100, the controller 240 may update information about content and a time stamp that are recorded in the DB and are lastly uploaded by the electronic device 100.

If an update determination request is received from the electronic device 100, the controller 240 determines update information based on information stored in the DB and transmits a newly generated content to the electronic device 100.

If a download result is received from the electronic device 100, the controller 240 updates the DB. More specifically, if the download result is received from the electronic device 100, the controller 240 updates information about content and a time stamp that are recorded in the DB and lastly downloaded by the electronic device 100.

Through the electronic device 100 and the personal cloud device 200 as described above, a user may share contents with another electronic device by using the personal cloud device 200.

Figure 11:
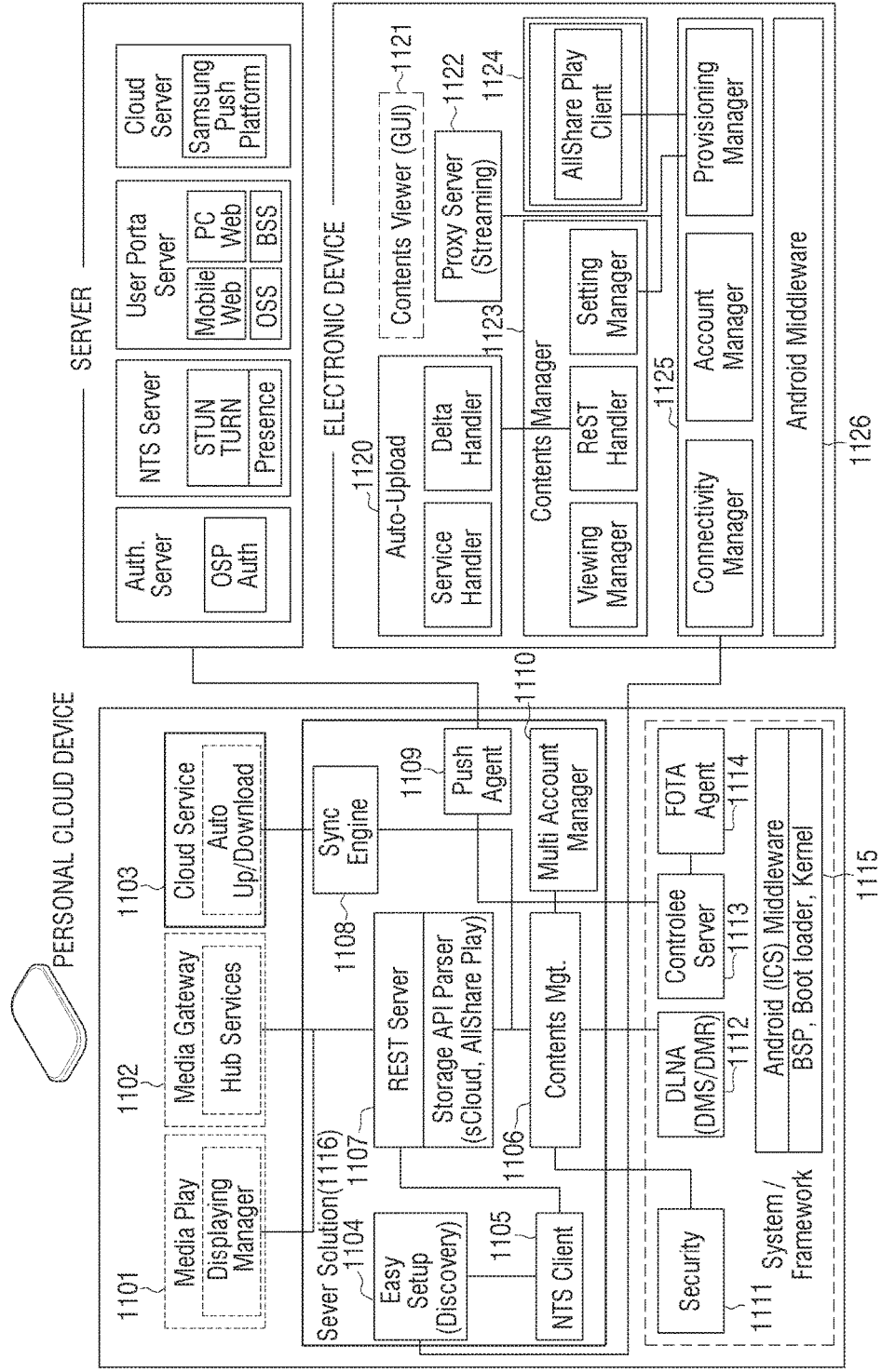
FIG. 11 is a block diagram illustrating a soft module configuration of a personal cloud system according to an embodiment of the present disclosure.

FIG. 11 is a block diagram illustrating a soft module configuration of a personal cloud device according to an embodiment of the present disclosure.

Referring to FIG. 11, the personal cloud device 200 stores a media play module 1101, a media gateway module 1102, a cloud service module 1103, an easy setup module 1104, a Network Tracking System (NTS) client module 1105, a content management module 1106, a REpresentational State Transfer (REST) server module and a storage Application Programming Interface (API) parser module 1107, a sync engine module 1108, a push agent module 1109, a multi account manager module 1110, a security module 1111, a Digital Living Network Alliance (DLNA) module 1112, a controlee server module 1113, a Firmware Over The Air (FOTA) agent module 1114, and a middleware module and a Basic Security Profile (BSP), Kernal, Boot loader modules 1115.

Here, the middleware module and the BSP, Kernal, Boot loader module 1115 manage booting a system and a file system and set firmware of the system, such as a network setting, a graphic setting, or the like. The security module 1111 sets coding/decoding of content and an access authority to the content. The DLNA module 1112 processes a multimedia standard protocol for sharing contents. The controlee server module 1113 receives a remote control command of a client. The FOTA agent module 1114 manages updating of firmware of the personal cloud device 200.

The easy setup module 1104 manages a communication protocol with the electronic device 100 to register the personal cloud device 200 in the registration server 530. The NTS client module 1105 manages a connection to the network server 540 based on a peer ID. The content management module 1106 controls an interface with a media player that plays a stored content. The REST server module and storage API parser module 1107 operates as a classifier that receives and processes a command transmission format, such as playing of content, from the client, analyzes an API of a message requested through a server to handle the content, shares the content, and divides and handles a personal area. The sync engine module 1108 maintains content synchronization between the public cloud server 520 and the client. The push agent module 1109 notifies updated contents, such as changed contents of contents, changed contents of a user account list, and the like. The multi account manager module 1110 manages a plurality of user accounts.

The media play module 1101 plays content through an output device (for example, a smart TV). The media gateway module 1102 operates as content hub of music and images. The cloud service module 1103 manages automatic uploading and downloading setting of content.

A server includes an authentication server, an NTS server, a user portal server, a cloud server, and the like.

The electronic device 100 includes an auto upload module 1120, a content viewer module 1121, a proxy server module 1122, a content manager module 1123, an Allshare play client module 1124, an easy setup solution module 1125, and an Android middleware module 1126.

The Android middleware module 1126 manages booting of the system and the file system and sets firmware of the system, such as a network setting, a graphic setting, or the like.

The easy setup solution module 1125 includes a connectivity manager module, an account manager module, and a provisioning manager module. The connectivity manager module sets a network, such as WiFi, Bluetooth, or the like, and identifies a type of network when being connected to the personal cloud device 200. The account manager module manages a user account that registers the personal cloud device 200. The provisioning manager module registers the personal cloud device 200 in the registration server 530, the authentication server 510, and the network server 540.

The Allshare play client module 1124 operates as an interface with a compatible application that may access the personal cloud device 200.

The content manager module 1123 includes a viewing manager module, a REST handler module, and a setting manager module. The viewing manager module manages playing and controlling of content on the electronic device 100. The REST handler module remotely transmits a play request for content of the personal cloud device 200. The setting manage module manages setting of automatic uploading and automatic downloading.

The proxy server module 1122 manages information transmission with a player installed in the electronic device 100 when playing the content.

The content viewer module 1121 generates a Graphic User Interface (GUI) for playing the content.

The auto upload module 1120 includes a service handler module that manages cycles of setting and executing automatic or manual uploading and a Delta handler module that manages new information of an updated content.

Therefore, the electronic device 100 and the personal cloud device 200 may share contents stored in the personal cloud device 200 inside or outside a home by using a software module as described above.

In the above-described embodiment, a plurality of electronic devices automatically upload or download contents to share contents stored in the personal cloud device 200. However, this is only an embodiment of the present disclosure, and thus, the personal cloud device 200 may set a particular area of the storage unit 230 as a secure area to provide a security function that may not be accessed by other users except an authenticated user.

More specifically, the personal cloud device 200 may provide a normal area from which a plurality of users freely upload or download contents and a secure area that may be accessed only by an authenticated user. Accordingly, an arbitrary user may be prevented from accessing content stored in the secure area of the personal cloud device 200. In addition, the personal cloud device 200 may perform a user authentication process and an encoding process with respect to a stored content so that only an authenticated user accesses the secure area.

More particularly, the personal cloud device 200 may perform the user authentication process by using a public key and a private key. For example, the personal cloud device 200 may perform the user authentication process by using a Rivest Shamir Adleman (RSA) encoding technique. A method of performing a user authentication process to provide a security function of the personal cloud device to a user will now be described with reference to FIG. 12.

Figure 12:
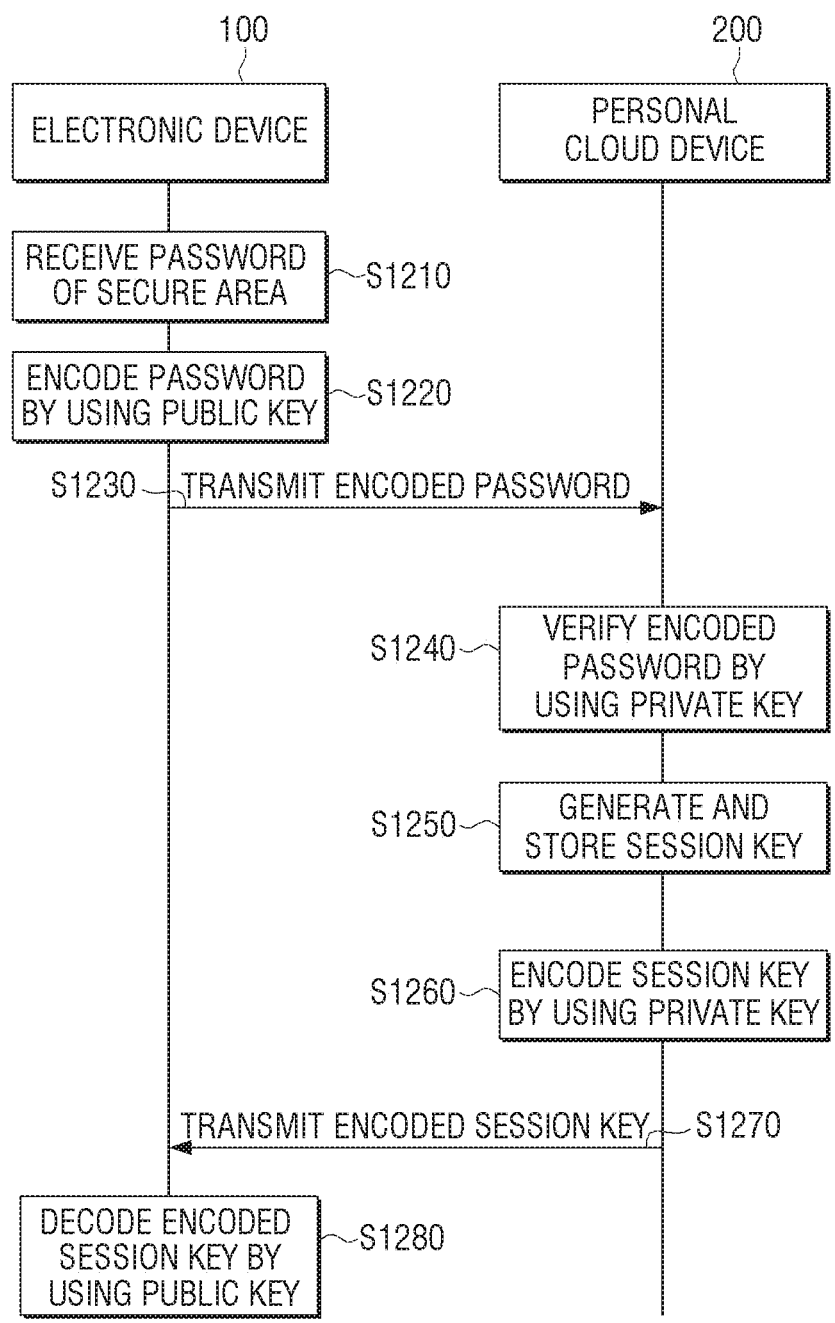
FIG. 12 is a flow diagram illustrating a security function of a personal cloud system according to an embodiment of the present disclosure.

FIG. 12 is a flow diagram illustrating a security function of a personal cloud system according to an embodiment of the present disclosure.

Referring to FIG. 12, in operation S1210, the electronic device 100 receives a password of a secure area of the personal cloud device 200 from a user.

In operation S1220, the electronic device 100 encodes the password by using a public key. Here, the public key may be stored in the electronic device 100 when installing an application.

In operation S1230, the electronic device 100 transmits the encoded password to the personal cloud device 200.

In operation S1240, the personal cloud device 200 verifies the encoded password transmitted to the electronic device 100 by using a private key. More specifically, the personal cloud device 200 may decode the encoded password by using the private key of the personal cloud device 200 and verify whether the decoded password has been justly encoded.

If the encoded password is completely verified, the personal cloud device 200 generates and stores a session key in operation S1250. Here, the personal cloud device 200 may map and store corresponding user information (for example, an ID, a password, and the like) with the session key.

In operation S1260, the personal cloud device 200 encodes the session key by using the private key. In operation S1270, the personal cloud device 200 transmits the encoded session key to the electronic device 100.

In operation S1280, the electronic device 100 decodes the encoded session key by using the public key to perform a user authentication process.

The user may perform the above-described user authentication process to control (for example, play, store, restore, and the like) content stored in the secure area of the personal cloud device 200.

The personal cloud device 200 may access content stored in a normal area by using only a server solution module 1116 in response to an automatic uploading/downloading request for content stored in a normal area. However, the personal cloud device 200 may access content stored in the secure area through only the server solution module 1116 and an additional security module 1111 in response to an access request for the secure area. The personal cloud device 200 may encode content to exchange data between the secure area of the storage unit 230, the security module 1111, and the server solution module 1116 in order to input and/or output content of the secure area.

According to various embodiments of the present disclosure as described above, the personal cloud device 200 may provide a secure area in which a plurality of users freely share contents and which may be accessed only by a particular user.

A program code for performing a method of registering the personal cloud device 200 according to various embodiments of the present disclosure as described above may be stored on various types of recording media. More specifically, the program code may be stored on various types of computer-readable recording media, such as a Random Access Memory (RAM), a flash memory, a Read Only Memory (ROM), an Erasable Programmable ROM (EPROM), an Electronically Erasable and Programmable ROM (EEPROM), a Compact Disc (CD)-ROM, and the like.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of sharing content of an electronic device, the method comprising:
  connecting to an external device configured to share the content with another electronic device;
  if a new first content is added to a set first folder, determining an upload condition of the electronic device;
  if the upload condition satisfies a set condition, transmitting the first content to the external device;
  determining a download condition of the electronic device;
  if the download condition of the electronic device satisfies a set condition, periodically requesting update information of a DataBase (DB) from the external device;
  if the update information exists in the DB, downloading an updated second content from the external device; and
  storing the second content in a second folder,
  wherein the DB is configured to manage contents of the external device, and wherein the requesting of update information of a DB comprises requesting the external device to identify updated content information in the DB based on content information and a time stamp with respect to lastly downloaded content by the electronic device which are recorded in the DB of the external device and to transmit the updated content information to the electronic device if the updated content information exists in the DB.

2. The method of claim 1, wherein the upload condition comprises at least one of a status of a network connected between the electronic device and the external device, and battery information of the electronic device.

3. The method of claim 2, wherein, if the electronic device and the external device are connected to each other through a set network interface, and a residual amount of a battery of the electronic device is higher than or equal to a set value, the first content is transmitted to the external device.

4. The method of claim 1, wherein, if the first content is transmitted, the external device stores the first content in a set folder and updates a DataBase (DB) configured to manage contents.

5. The method of claim 1, wherein the download condition comprises at least one of a status of a network connected between the electronic device and the external device, battery information of the electronic device, and memory information of the electronic device.

6. The method of claim 1, further comprising:
if the second content is completely downloaded, transmitting a download result to the external device,
wherein the external device updates content information and a time stamp lastly updated by the electronic device based on the download result.

7. The method of claim 1, further comprising:
if the first content stored in the first folder is revised to generate a third content, determining an upload condition of the electronic device; and
if the upload condition satisfies a set condition, transmitting the third content to the external device,
wherein the external device stores the first and third contents together.

8. The method of claim 1, further comprising:
if a fourth content generated by revising the second content exists in the DB of the external device, downloading the fourth content from the external device; and
storing the downloaded fourth content and the second content together in the second folder.

9. The method of claim 1, wherein, if an external device is connected to the external device through a wire, and content stored in the external device is uploaded into the external device, the external device updates the DB of the external device, and the electronic device downloads the content stored in the external device from the external device.

10. The method of claim 1, wherein, if an external device is connected to the external device through a wire, and a new sixth content is overwritten on a fifth content stored in the external device through the external device, the external device stores the sixth content and a time stamp when the sixth content is overwritten, in the DB, and the electronic device determines the time stamp to download the sixth content in order to store the sixth content and the fifth content together.

11. An electronic device comprising:
a communicator configured to communicate with an external device configured to share contents with another device;
a memory configured to store the contents; and
at least one processor configured to:
control the communicator to determine an upload condition of the electronic device if a new first content is added to a set first folder of the memory,
transmit the first content to the external device if the upload condition satisfies a set condition,
determine a download condition of the electronic device,
periodically request update information of a DataBase (DB) from the external device if the download condition of the electronic device satisfies a set condition,
control the communicator to download an updated second content from the external device if the update information exists in the DB,
store the second content in a second folder,
control the communicator to request the external device to identify updated content information in the DB based on content information and a time stamp with respect to lastly downloaded content by the electronic device which are recorded in the DB of the external device, and
transmit the updated content information to the electronic device if the updated content information exists in the DB,
wherein the DB is configured to manage contents of the external device.

12. The electronic device of claim 11, wherein the upload condition comprises at least one of a status of a network connected between the electronic device and the external device, and battery information of the electronic device.

13. The electronic device of claim 12, wherein, if the electronic device and the external device are connected to each other through a set network interface, and a residual amount of a battery of the electronic device is higher than or equal to a set value, the at least one processor is further configured to control the communicator to transmit the first content to the external device.

14. The electronic device of claim 11, wherein, if the first content is transmitted, the external device is further configured to:
store the first content in a set folder, and
update a DataBase (DB) configured to manage contents.

15. The electronic device of claim 11, wherein the download condition comprises at least one of a status of a network connected between the electronic device and the external device, battery information of the electronic device, and memory information of the electronic device.

16. The electronic device of claim 11,
wherein, if the second content is completely downloaded, the at least one processor is further configured to control the communicator to transmit a download result to the external device, and
wherein the external device is further configured to update content information and a time stamp lastly downloaded by the electronic device based on the download result.

17. The electronic device of claim 11,
wherein, if the first content stored in the first folder is revised to generate a third content, the at least one processor is further configured to:
determine an upload condition of the electronic device and, if the upload condition satisfies a set condition, and
control the communicator to transmit the third content to the external device, and wherein the external device stores the first and third contents together.

18. The electronic device of claim 11, wherein, if a fourth content generated by revising the second content exists in the DB of the external device, the at least one processor is further configured to:
   control the communicator to download the fourth content from the external device, and
   control the memory to store the downloaded fourth content and the second content together in the second folder.

19. The electronic device of claim 11, wherein, if an external device is connected to the external device through a wire, and content stored in the external device is uploaded into the external device, the external device is further configured to update the DB of the external device, and the at least one processor is further configured to control the communicator to download the content stored in the external device from the external device.

20. The electronic device of claim 11, wherein, if an external device is connected to the external device through a wire, and a new sixth content is overwritten on a fifth content stored in the external device through the external device, the external device is further configured to store the sixth content and a time stamp when the sixth content is overwritten, in the DB, and the at least one processor is further configured to:
   control the communicator to determine the time stamp in order to download the sixth content, and
   control the memory to store the sixth content and the fifth content together.

21. A method of sharing content in an external system comprising a first electronic device, a second electronic device, and an external device, the method comprising:
   connecting between the first electronic device, the second electronic device, and the external device;
   if a new first content is added to a set first folder of the first electronic device, determining an upload condition of the first electronic device through the first electronic device;
   if the upload condition satisfies a first set condition, transmitting the first content from the first electronic device to the external device;
   storing the first content in the external device and updating information of a DataBase (DB);
   determining a download condition of the second electronic device through the second electronic device;
   if the download condition satisfies a second set condition, requesting update information of the DB of the external device through the second electronic device;
   if the update information exists in the DB, downloading the first content from the external device through the second electronic device; and
   storing the first content in a set second folder of the second electronic device,
   wherein the requesting of update information of a DB comprises requesting the external device to identify updated content information in the DB based on content information and a time stamp with respect to lastly downloaded content by the second electronic device which are recorded in the DB of the external device and to transmit the first content information to the second electronic device if the first content information exists in the DB.

* * * * *